United States Patent
Dey et al.

(10) Patent No.: US 9,390,317 B2
(45) Date of Patent: Jul. 12, 2016

(54) LIP ACTIVITY DETECTION

(75) Inventors: Prasenjit Dey, Bangalore (IN); Sriganesh Madhvanath, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 124 days.

(21) Appl. No.: 13/980,827

(22) PCT Filed: Mar. 21, 2011

(86) PCT No.: PCT/IN2011/000183
§ 371 (c)(1),
(2), (4) Date: Jul. 19, 2013

(87) PCT Pub. No.: WO2012/127477
PCT Pub. Date: Sep. 27, 2012

(65) Prior Publication Data
US 2014/0010418 A1    Jan. 9, 2014

(51) Int. Cl.
*G06K 9/00* (2006.01)
*G06F 3/01* (2006.01)
*G06F 3/03* (2006.01)

(52) U.S. Cl.
CPC ............ *G06K 9/00281* (2013.01); *G06F 3/012* (2013.01); *G06F 3/0304* (2013.01); *G06K 9/00335* (2013.01)

(58) Field of Classification Search
None
See application file for complete search history.

(56) References Cited

U.S. PATENT DOCUMENTS

| 6,754,373 | B1 | 6/2004 | Cuetos et al. |
| 7,835,568 | B2 | 11/2010 | Park et al. |
| 2003/0212552 | A1 | 11/2003 | Liang et al. |
| 2010/0085446 | A1 | 4/2010 | Thorn |

FOREIGN PATENT DOCUMENTS

| CN | 101937268 | 1/2011 |
| EP | 0863474 | 9/1998 |
| KR | 20050019599 | 3/2005 |

OTHER PUBLICATIONS

Bendris, Meriem, Delphine Charlet, and Gérard Chollet. "Lip activity detection for talking faces classification in TV-content." International Conference on Machine Vision. 2010.*

Essa, Irfan A., and Alex P. Pentland. "Facial expression recognition using a dynamic model and motion energy." Computer Vision, 1995. Proceedings., Fifth International Conference on. IEEE, 1995.*

Basu, Sumit, Irfan Essa, and Alex Pentland. "Motion regularization for model-based head tracking." Pattern Recognition, 1996., Proceedings of the 13th International Conference on. vol. 3. IEEE, 1996.*

Iyengar, Giridharan, and Chalapathy Neti. "A vision-based microphone switch for speech intent detection." Recognition, Analysis, and Tracking of Faces and Gestures in Real-Time Systems, 2001. Proceedings. IEEE ICCV Workshop on. IEEE, 2001.*

(Continued)

*Primary Examiner* — Vikkram Bali
*Assistant Examiner* — Tracy Mangialaschi
(74) *Attorney, Agent, or Firm* — HP Inc Patent Department

(57) ABSTRACT

Provided is a method of detecting lip activity. The method determines magnitude of optical flow in lip region and at least one non-lip region of a detected face. The ratio of magnitude of optical flow in lip region and at least one non-lip region is compared against a threshold. If the ratio is found to be greater than the threshold, lip activity of the detected face is recognized.

9 Claims, 4 Drawing Sheets

(56) References Cited

OTHER PUBLICATIONS

Aubrey, A. J., Y. A. Hicks, and J. A. Chambers. "Visual voice activity detection with optical flow." IET image processing 4.6 (2010): 463-472.*

Mase, Kenji, and Alex Pentland. "Automatic lipreading by optical-flow analysis." Systems and Computers in Japan 22.6 (1991): 67-76.*

Gurban, Mihai, and Jean-Philippe Thiran. "Multimodal speaker localization in a probabilistic framework." Signal Processing Conference, 2006 14th European. IEEE, 2006.*

Tamura, Satoshi, Koji Iwano, and Sadaoki Furui. "Multi-modal speech recognition using optical-flow analysis for lip images." Real World Speech Processing. Springer US, 2004. 43-50.*

Bradsky Gray, Kaehler Adrian, OReilly-LearningOpenCV, Computer Vision with OpenCv library. p. 322-334, 2008.

Hasan Ertan Cetingul, "Discrimination Analysis Of Lip Motion Features For Multimodal Speaker Identification And Speech-Reading", Koc University, Jul. 2005.

Hiroshi Hojo, Nozomu Hamada, "Mouth Motion Analysis With Space-Time Interest Points", Keio University, IEEE 2009.

International Search Report and Written Opinion dated Dec. 29, 2011 issued on PCT Patent Application No. PCT/IN2011/000183 filed on Mar. 21, 2011, The State Intellectual Property Office, the P.R. China.

Libal, V. et al., "An Embedded System for In-Vehicle Visual Speech Activity Detection" Multimedia Signal Processing, 2007, MMSP 2007, IEEE 9th Workshop on Oct. 1-3, 2007 pp. 255-258.

P. Viola and M. Jones, "Rapid Object Detection Using a Boosted Cascade of Simple Features", in Proc. IEEE CVPR, Kauai, HI, USA, Dec. 9-14, 2001, vol. 1, pp. 511-518.

P. Viola, M. Jones, "Robust Real-Time Face Detection", International Journal of Computer Vision, vol. 57, pp. 137-154, May 2004.

R. Lienhart and J. Maydt, "An Extended Set of Haarlike Features for Rapid Object Detection", in IEEE ICIP, Rochester, NY, USA, Sep. 22-25, 2002, vol. 1, pp. 900-903.

S. Siatras, N. Nikolaidis, Michail Krinidis, Ioannis Pitas, "Visual Lip Activity Detection and Speaker Detection Using Mouth Region Intensities", Circuits and Systems for Video Technology, IEEE Transactions, vol. 19, pp. 133-137, Jan. 2009.

* cited by examiner

US 9,390,317 B2

LIP ACTIVITY DETECTION

CLAIM FOR PRIORITY

The present application is a national stage filing under 35 U.S.C 371 of PCT application number PCT/IN2011/000183, having an international filing date of Mar. 21, 2011, the disclosure of which is hereby incorporated by reference in its entirety.

BACKGROUND

Human-computer interaction has evolved considerably over the years. From good old command line based interfaces to present day multimodal interactive systems, developers are redefining the way people engage with computing devices. Intuitive interfaces are gaining importance. For example, touch based input is being increasingly preferred on handheld devices, such as, mobile phones, smart phones, PDAs (Personal Digital Assistant), touchpad, etc.

Speech is another modality that has been used either alone or in conjunction with other input modalities, such as, traditional keyboard, mouse input, gestures, gaze, etc. to interact with a computing device. Speech input may be used to convert spoken words into text, to provide commands or to control a computer application. For example, speech recognition has been used for voice dialing, performing a search, providing an interactive voice response, playing video games and controlling a robotic device.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

As mentioned earlier, speech may be used as an input to perform a variety of tasks on a computing device. However, one of the difficulties with recognition of speech as an input is the presence of spurious speech in the surrounding environment. For example, while providing a speech input to a computing system, there may be other people or users speaking in the background, or there may be ambient noise due to vehicular traffic, a procession, a festival event, a party, and the like. Under such circumstances, it becomes difficult for a computing system to identify speech of an actual user from other people's voices. This may lead to improper command execution and undesirable results.

Considering that a speech input may constitute an integral mode of a multimodal user interface, identification and recognition of "genuine" speech is important for the robustness of a multimodal interaction system as a whole. A weak speech recognition system may mar a user's experience with a multimodal user interface, even if other modalities (such as, touch, gesture, gaze, etc.) function effectively.

The proposed solution provides a mechanism to infer speech activity of a user of a computing device. It detects lip activity using optical flow to determine speech activity of a user. The solution enables rejection of spurious speech originating from other users in the surrounding. Detection of lip activity of a user along with audio activity from the same direction can be used to infer a "genuine" speech command. Absence of either of these is taken as an indication of an ambient speech activity or other lip movements apart from speech (such as, chewing of gum, a smile, etc.).

Embodiments of the present solution provide a method and system for detecting lip activity.

For the sake of clarity, the term "user", in this document, may include a "consumer", an "individual", a "person", or the like.

It is also clarified that the term "module", as used herein, may mean to include a software component, a hardware component or a combination thereof. A module may include, by way of example, components, such as software components, processes, functions, attributes, procedures, drivers, firmware, data, databases, and data structures. The module may reside on a volatile or non-volatile storage medium and configured to interact with a processor of a computing device (system).

Figure 1:
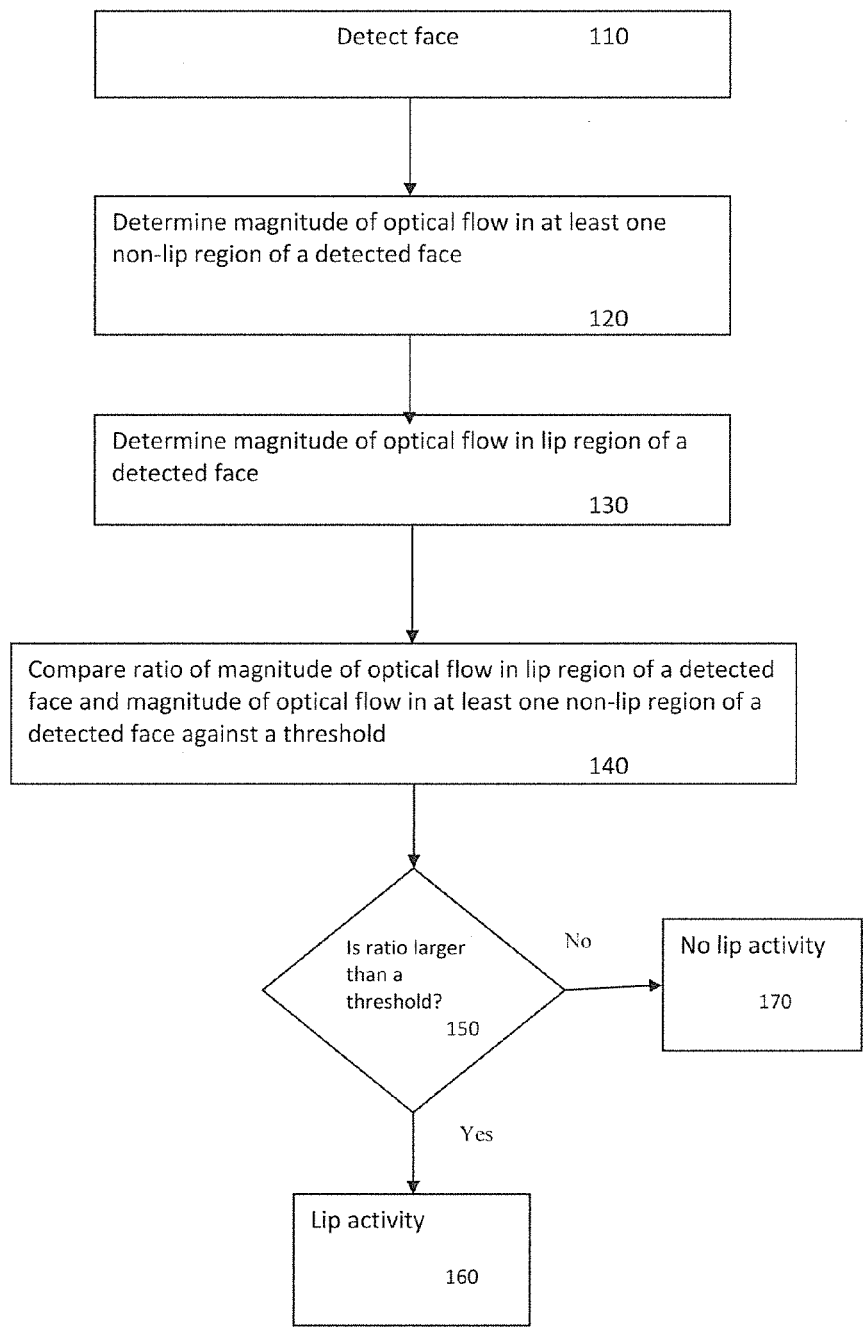
FIG. 1 shows a flow chart of a computer-implemented method of detecting lip activity according to an embodiment.

FIG. 1 shows a flow chart of a computer-implemented method of detecting lip activity according to an embodiment.

The method may be implemented on a computing device (system), such as, but not limited to, a personal computer, a desktop computer, a laptop computer, a notebook computer, a network computer, a personal digital assistant (PDA), a mobile device, a hand-held device, or the like. A typical computing device that may be used is described further in detail subsequently with reference to FIG. 4.

Additionally, the computing device may be connected to another computing device or a plurality of computing devices via a network, such as, but not limited to, a Local Area Network (LAN), a Wide Area Network, the Internet, or the like.

Referring to FIG. 1, block 110 involves face detection of a user of a computing device. In an example, the computing device may comprise an imaging device for capturing an image of a user. The imaging device may include a camera, which may capture an image of the user as a still image, a video data stream or an audio video (AV) data stream. Once captured, the image may be processed by a face detection module residing in the memory of the computing device for detecting the user's face. In an example, Viola-Jones face detection method may be used for face detection. However, other face detection methods, such as, but not by way of limitation, Schneiderman & Kanade's and Rowley, Baluja & Kanade's methods, may also be used. The face detection module may, amongst other features, recognize the size and location of the user's face in the captured image. It also detects the lip region of a user using face geometry, thereby distinguishing the lip region from a non-lip region(s).

In another example, multiple people may be using a computing device. In such case, the computing device detects faces of all users.

Also, the imaging device may be removably or non-removably attachable to the computing device.

Block 120 involves determination of magnitude of optical flow in at least one non-lip region of a detected face. Optical flow is the apparent motion of brightness patterns in an image. Generally, optical flow corresponds to the motion field. In an example, the magnitude of optical flow in at least one non-lip region of a face detected at block 110 is determined. In the present example, a $3^{rd}$ level Pyramidal Lucas-Kanade optical flow method may be used for determining magnitude of optical flow in at least one non-lip region of a detected face.

However, optical flow detection methods, such as, but not by way of limitation, phase correlation method, block-phase methods, Horn-Schunk method, Buxton-Buxton method, Black-Jepson method, discrete optimization methods may also be used.

Also, in the present example, the cheek region of a detected face may be used for determination of magnitude of optical flow in a non-lip region. However, in other examples, different non-lip regions (such as, forehead) of the face may also be used.

Furthermore, in another example, more than one non-lip region of a detected face may be used for determination of magnitude of optical flow in the non-lip region. For example, both the cheek region and the forehead region may be used together for determination of magnitude of optical flow in the non-lip region of a detected face. In such case, a mean of the magnitude of optical flow in the cheek region and the magnitude of optical flow in the forehead region of a detected face is taken.

Block 130 involves determination of magnitude of optical flow in lip or mouth region of a detected face. In an example, the magnitude of optical flow in the lip region of a face detected at block 110 is determined. In the present example, a $3^{rd}$ level Pyramidal Lucas-Kanade optical flow method may be used for determining magnitude of optical flow in the lip region of a detected face. However, optical flow detection methods, such as, but not by way of limitation, phase correlation method, block-phase methods, Horn-Schunk method, Buxton-Buxton method, Black-Jepson method, discrete optimization methods may also be used.

Block 140 involves a comparison between a ratio of magnitude of optical flow in lip region of a detected face and magnitude of optical flow in at least one non-lip region of a detected face with a threshold. In an example, a ratio of the magnitude of optical flow computed in the lip region of a detected face (block 130) and the magnitude of optical flow computed for at least one non-lip region of a detected face (block 120) is determined. The ratio is then compared against a threshold which may be decided based on experimentation. To illustrate, a ratio of the magnitude of optical flow in the lip region and the magnitude of optical flow in the forehead region may be compared against a pre-determined threshold.

In another example, if more than one non-lip region (for example, cheek and forehead regions) of a detected face is selected for determination of magnitude of optical flow in the non-lip region, a mean of the magnitude of optical flow in selected non-lip regions is taken as magnitude of optical flow in the non-lip region. The mean is then used for the computation of the ratio between the magnitude of optical flow in lip region and selected non-lip regions of a detected face.

Upon comparison (block 150), if it is found, that the ratio of the magnitude of optical flow computed in the lip region of a detected face and the magnitude of optical flow computed for at least one non-lip region of a detected face is greater than the threshold, the lip activity of a detected face is recognized (block 160) i.e. it indicates lip movement or lip motion in a detected face. On the other hand, if the ratio is smaller than the threshold, it implies no lip activity or movement in a detected face (block 170).

In case there are multiple detected faces, the method distinguishes faces that are showing lip activity from the ones where no lip activity is indicated. For example, in a multi-user interaction one can determine which user is speaking and hence execute commands based on that user's context. If the identity of the user is recognized through face recognition, a command, for instance, "show my photos" from a user among multiple users can be resolved by correlating the identity and lip activity of the identified user.

Figure 2A:
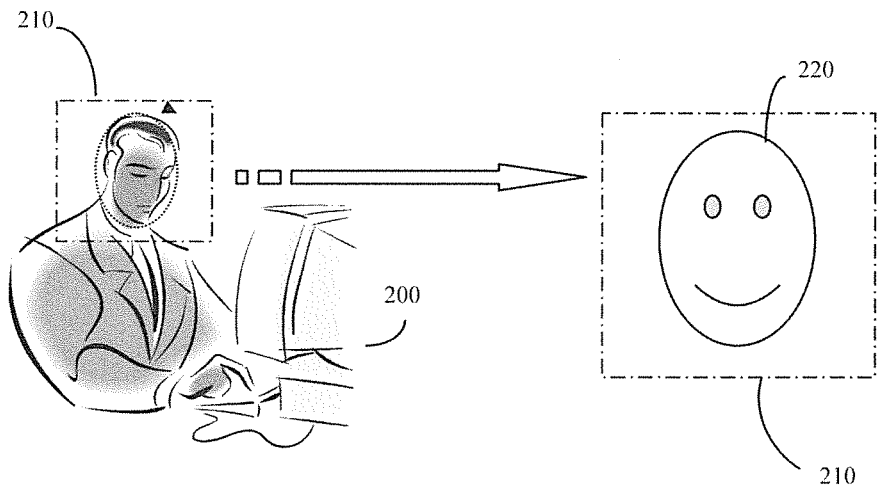
FIGS. 2A and 2B illustrate some aspects of the method of FIG. 1 according to an embodiment.
Figure 2B:
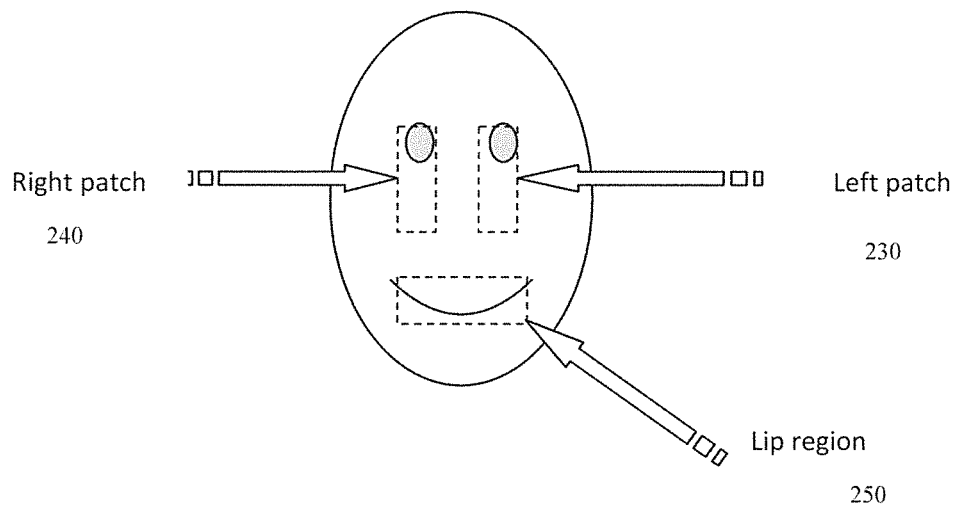

FIGS. 2A and 2B illustrate some aspects of the method of FIG. 1 according to an embodiment.

FIG. 2A illustrates face detection of a user of a computing device 200. In the present example, a computing device 200 has captured an image 210 of a user. The image 210 may be a still image, a video data stream or an audio video (AV) data stream. The image is processed by a face detection module residing on the computing device 200 for detecting the user's face 220.

FIG. 2B illustrates identification and subsequent determination of magnitude of optical flow in the lip region and at least one non-lip region of detected face 220. The non-lip regions of face used for determination of magnitude of optical flow include a left patch 230 below the left eye and a right patch 240 below the right eye. For determination of magnitude of optical flow in the non-lip region of detected face 220, a mean of magnitude of optical flow in the left patch 220 and magnitude of optical flow in the right patch 240 may be taken. Lip region 250 may be used for determining amount of optical flow in the lip region of detected face 220.

Figure 3:
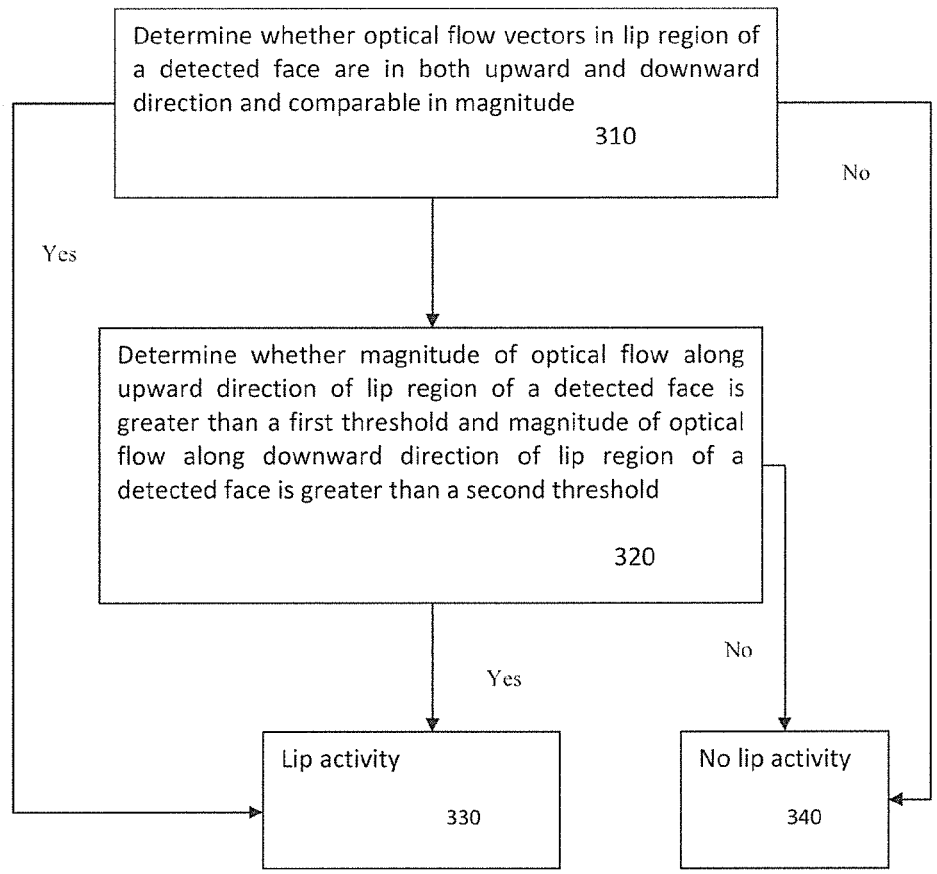
FIG. 3 shows a flow chart of a computer-implemented method of detecting lip activity according to an embodiment.

FIG. 3 shows a flow chart of a computer-implemented method of detecting lip activity according to an embodiment.

FIG. 3 illustrates further optional or additional steps that may be carried for detecting lip activity of a user or multiple users of a computing device.

Block 310 involves determination of direction of optical flow vectors in lip region of a detected face (such as the one detected at block 110). Optical flow arises from relative motion of an object and a viewer. In an example, while determining magnitude of optical flow in the lip region of a detected face, the direction of optical flow vectors along X and Y axis (at the lip region) is determined. If it is found that the direction of optical flow vectors in the lip region is both in upward and downward direction (i.e. only along the Y axis) and of comparable magnitude, the lip activity of a detected face is recognized (block 330). In other words, bidirectional movement of optical flow vectors of comparable magnitude along Y-axis in the lip region indicates lip activity in a detected face. On the other hand if it is found that that the direction of optical flow vectors in the lip region is either in upward or downward direction (unidirectional) only, or along the X-axis, it indicates absence of lip activity in the detected face (block 340).

Determination of direction of optical flow vectors removes spurious lip activity detections due to head motion in the vertical direction or due to forward backward motion. In both cases, optical flow along opposite directions and of comparable magnitude is not observed. For example, in case of head movement in the vertical direction, there may be optical flow vectors present along the positive vertical (Y) axis, but none may be observed down the negative vertical (Y) axis.

Block 320 involves determination of magnitude of optical flow along upward and downward direction of the lip region of a detected face. The magnitude of optical flow along positive vertical (Y) axis and negative vertical (Y) axis is determined. It is observed that the vertical component of optical flow along both positive and negative vertical axis is large in magnitude and almost equal in proportion.

In an example, the magnitude of optical flow along upward direction of the lip region of a detected face is compared against a first threshold (previously determined). Similarly, the magnitude of optical flow along downward direction of the lip region is compared against a second threshold (again, previously determined). If upon comparison it is found that the magnitude of optical flow along upward direction of the lip region of a detected face is greater than the first threshold and the magnitude of optical flow along downward direction of lip region is greater than the second threshold, and the magnitude of the flows in the opposite directions are comparable, lip activity of a detected face is recognized. If the magnitude of optical flow along upward and downward direction of the lip region is greater than their respective thresholds, it indicates that there is lip movement in the detected face (block 330). The presence of a threshold on the individual optical flow magnitudes in upward and downward direction ensures that spurious lip movements do not result in detections even though they may be of comparable magnitude. Conversely, an upward and downward optical flow above the threshold may not indicate genuine lip activity unless they are bi-directional and of comparable magnitude.

In an example, the first and second threshold may be of different value. In another example, however, the first and second threshold may be of same value.

Figure 4:
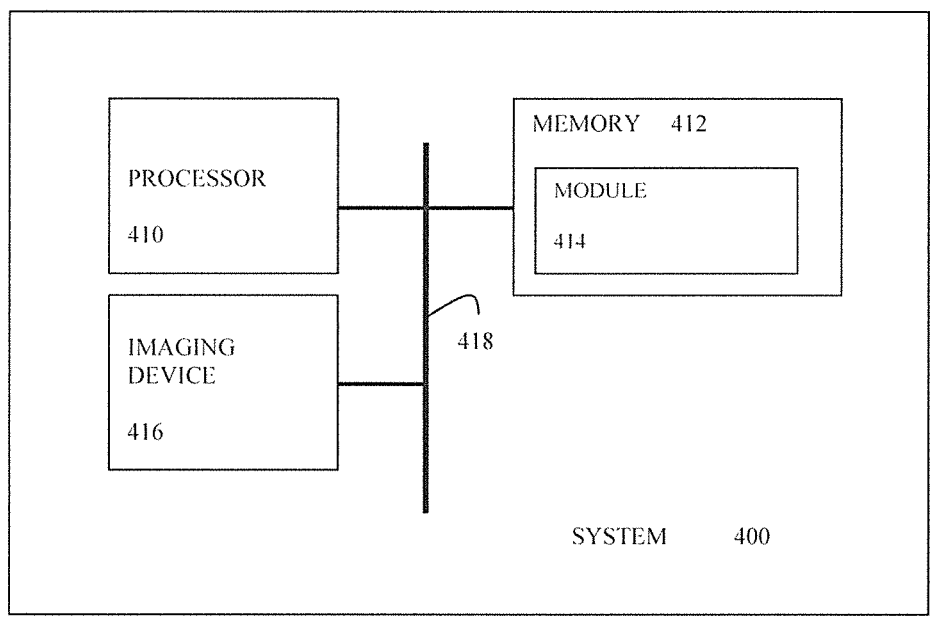
FIG. 4 shows a block diagram of a computing system according to an embodiment.

FIG. 4 shows a block diagram of a computing system according to an embodiment.

The system 400 may be a computing device, such as, but not limited to, a personal computer, a desktop computer, a laptop computer, a notebook computer, a network computer, a personal digital assistant (PDA), a mobile device, a handheld device, or the like.

System 400 may include a processor 410, for executing machine readable instructions, a memory 412, for storing machine readable instructions (such as, a module 414), and an imaging device 416. These components may be coupled together through a system bus 418.

Processor 410 is arranged to execute machine readable instructions. The machine readable instructions may comprise a module that determines magnitude of optical flow in lip region of a detected face, determines magnitude of optical flow in at least one non-lip region of the detected face, compares ratio of magnitude of optical flow in lip region of the detected face and magnitude of optical flow in at least one non-lip region of the detected face against a threshold, and if the ratio is greater than the threshold, recognizes lip activity of the detected face. Processor 410 may also execute modules related to face detection of a user or multiple users.

The memory 412 may include computer system memory such as, but not limited to, SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. The memory 412 may include a module 414. In an example, the module 414 may be a face detection module that includes machine executable instructions for detecting a user's face in an image. The image may be a still photograph, a video data stream or an audio-video data stream.

Imaging device 416 is used to capture an image or a series of images of a user or multiple users. The imaging device may be a separate device, which may be attachable to the computing system 400, or it may be integrated with the computing system 400. In an example, the imaging device 416 may be a camera, which may be a still camera, a video camera, a digital camera, and the like.

It would be appreciated that the system components depicted in FIG. 4 are for the purpose of illustration only and the actual components may vary depending on the computing system and architecture deployed for implementation of the present solution. The various components described above may be hosted on a single computing system or multiple computer systems, including servers, connected together through suitable means.

The examples described detect the magnitude (amount) of optical flow in the lip (mouth) region to detect lip activity. The method requires no training and lip detection may take place as soon as a user comes in the range of vision of an imaging device. The proposed solution also works well in less illuminated environments. It does not require any history to be maintained and optical flow is calculated over a very small part of a detected face which makes the mechanism less calculation intensive.

It will be appreciated that the embodiments within the scope of the present solution may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present solution is for the purpose of illustration only. Although the solution has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present solution.

The invention claimed is:

1. A computer-implemented method of detecting lip activity, comprising:
    capturing, by a camera of a computing device, an image of a user;
    detecting a face of the user on the captured image;
    determining, by a processor of the computing device, a magnitude of optical flow in a lip region of the detected face on the captured image;
    determining, by the processor, a magnitude of optical flow in at least one non-lip region of the detected face on the captured image;
    determining, by the processor, a ratio of the magnitude of optical flow in the lip region and the magnitude of optical flow in the at least one non-lip region of the detected face;
    comparing, by the processor, the ratio of the magnitude of optical flow in the lip region of the detected face and the magnitude of optical flow in the at least one non-lip region of the detected face against a threshold; and
    determining that a lip activity of the detected face has been detected when the ratio is greater than the threshold.

2. A method according to claim 1, wherein the detected face is present in a video data stream or an audio-visual data stream.

3. A method according to claim 1, wherein the at least one non-lip region includes a plurality of non-lip regions, and the method further comprising:

determining, by the processor, a mean value of the magnitude of optical flow of the plurality of non-lip regions; and using the mean value as the magnitude of optical flow for the at least one non-lip region.

4. A method according to claim 1, wherein the at least one non-lip region includes a forehead region or cheek region of the detected face.

5. A non-transitory computer-readable storage medium storing machine readable instructions that when executed by a processor cause the processor to perform the method of claim 1.

6. A system, comprising:
 a camera to capture an image of a user;
 a memory storing machine readable instructions; and
 a processor to execute the machine readable instructions to cause the processor to:
  detect a face of the user on the captured image;
  determine a magnitude of optical flow in a lip region of the detected face on the captured image,
  determine a magnitude of optical flow in at least one non-lip region of the detected face on the captured image,
  determine a ratio of the magnitude of optical flow in the lip region and the magnitude of optical flow in the at least one non-lip region of the detected face,
  compare the ratio of the magnitude of optical flow in the lip region of the detected face and the magnitude of optical flow in the at least one non-lip region of the detected face against a threshold, and
  determine that a lip activity of the detected face has been detected when the ratio is greater than the threshold.

7. A system according to claim 6, wherein the detected face is present in a video data stream or an audio-visual data stream.

8. A system according to claim 6, wherein the camera is removable or non-removable.

9. A system according to claim 6, wherein the machine readable instructions further cause the processor to:
 determine whether optical flow vectors in the lip region of the detected face move in both upward direction and downward direction, and
 in response to a determination that the optical flow vectors in the lip region move in both upward direction and downward direction, determine that the lip activity of the detected face has been detected.

\* \* \* \* \*